(12) United States Patent
Giaretta et al.

(10) Patent No.: US 8,787,249 B2
(45) Date of Patent: Jul. 22, 2014

(54) MOBILE IP MULTIPLE REGISTRATIONS AND PCC INTERACTIONS

(75) Inventors: Gerardo Giaretta, San Diego, CA (US); Jun Wang, La Jolla, CA (US); Kalle I. Ahmavaara, San Diego, CA (US); Lorenzo Casaccia, Rome (IT); Arungundram C. Mahendran, San Diego, CA (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 1080 days.

(21) Appl. No.: 12/365,615

(22) Filed: Feb. 4, 2009

(65) Prior Publication Data

US 2009/0196231 A1 Aug. 6, 2009

Related U.S. Application Data

(60) Provisional application No. 61/026,637, filed on Feb. 6, 2008.

(51) Int. Cl.
*H04W 4/00* (2009.01)
*H04W 80/04* (2009.01)
*H04W 36/00* (2009.01)

(52) U.S. Cl.
CPC .......... *H04W 80/04* (2013.01); *H04W 36/0011* (2013.01); *H04W 36/0016* (2013.01); *H04W 36/0022* (2013.01); *H04W 36/0027* (2013.01)
USPC ............ 370/328; 370/329; 370/331; 455/436

(58) Field of Classification Search
CPC ............ H04W 80/02; H04W 36/0011; H04W 36/0016; H04W 36/0022; H04W 36/0027
USPC .......................... 370/310, 328, 338, 329, 331; 455/436–444
See application file for complete search history.

(56) References Cited

U.S. PATENT DOCUMENTS

| | | | |
|---|---|---|---|
| 6,665,537 | B1 | 12/2003 | Lioy |
| 7,668,145 | B2 | 2/2010 | Le et al. |
| 2005/0226180 | A1* | 10/2005 | Devarapalli et al. .......... 370/328 |
| 2006/0129630 | A1* | 6/2006 | Catalina-Gallego et al. . 709/203 |

(Continued)

FOREIGN PATENT DOCUMENTS

| | | |
|---|---|---|
| RU | 2315436 C2 | 1/2008 |
| WO | WO02096128 A2 | 11/2002 |

(Continued)

OTHER PUBLICATIONS

International Search Report & Written Opinion—PCT/US2009/033151, International Search Authority—European Patent Office—May 6, 2009.

(Continued)

*Primary Examiner* — Mark Rinehart
*Assistant Examiner* — Mang Yeung
(74) *Attorney, Agent, or Firm* — Michael J. DeHaemer, Jr.

(57) ABSTRACT

In a wireless communication system having multiple access nodes, a home agent (HA) maintains home address (HoA) for a mobile node so that an IP session can be established. As the mobile node moves within a coverage area of various access nodes, the mobile node can establish a secure relationship with a local access gateway and thereby register a local IP address, referred to as a care-of-address (CoA), with the HA. Mobile IP protocol can be established so that multiple sessions can be conducted. In maintaining policy and charging control (PCC), HA informs a policy and charging rules function (PCRF), which in turn can then send the appropriate PCC rules (e.g., IP flows and related policies) to a policy and charging enforcement function (PCEF) for a particular access gateway. Coordination necessary to associate CoA and HoA can further include filter information as to application can run on a particular interface.

25 Claims, 6 Drawing Sheets

(56) References Cited

U.S. PATENT DOCUMENTS

2007/0189250 A1* 8/2007 Haddad et al. ............... 370/338
2007/0253371 A1 11/2007 Harper et al.

FOREIGN PATENT DOCUMENTS

| WO | WO2006020011 | 2/2006 |
| WO | WO2007039016 | 4/2007 |
| WO | WO2007082587 | 7/2007 |

OTHER PUBLICATIONS

Taiwan Search Report—TW098103928—TIPO—Feb. 8, 2012.

* cited by examiner

US 8,787,249 B2

MOBILE IP MULTIPLE REGISTRATIONS AND PCC INTERACTIONS

CLAIM OF PRIORITY UNDER 35 U.S.C. §119

The present Application for Patent claims priority to Provisional Application No. 61/026,637 entitled "MOBILE IP MULTIPLE REGISTRATIONS AND PCC INTERACTIONS" filed Feb. 6, 2008, assigned to the assignee hereof and hereby expressly incorporated by reference herein.

FIELD OF INVENTION

The exemplary and non-limiting aspects described herein relate generally to wireless communications systems, methods, computer program products and devices, and more specifically to techniques for policy and charging rules and enforcement for multiple mobile IP sessions.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

Semi-persistent scheduling (SPS) is a set of techniques for efficiently assigning resources for periodic traffic in a wireless communication system to support resource assignment with as little overhead as possible in order to improve system capacity.

Mobile Internet Protocol (Mobile IP or MIP) is a communication protocol that enables transparent routing of data packets to mobile devices in a wireless communication system. Under the Mobile IP protocol, a device can register with a home agent (HA), through which the device obtains a "home" IP address. The home address of the device can then be utilized to route data packets to and/or from the device regardless of the location of the device within a wireless communication network. Conventionally, a mobile device can register with a HA by first discovering a global IP address of the HA and subsequently setting up a security association with the HA based on its discovered IP address. Upon association with the HA, the device can signal updates to the HA relating to the location and/or status of the device. These updates can be utilized by the HA to provide data packets to the device, either directly or indirectly via an access point of a disparate network to which the device has moved.

However, complications arise regarding Mobile IP and policy charging control (PCC) interactions. In particular, the entities involved in the mobility management (i.e., mobile node and home agent) are different from the entities involved in quality of service (QoS) and policy (i.e., PCC) management, specifically named PCEF (Policy and Charging Enforcement Function) and PCRF (Policy and Charging Rules Function) respectively. When Mobile IP is not used, there is only one IP address used by the mobile node and this is communicated to the QoS management entities (i.e. PCRF). Based on this address the PCRF establishes the correct QoS in the system. However, when a mobile node performs a MIP registration with the HA, one of the IP address of the mobile node can change and the QoS management entities (i.e., PCRF) are not aware of that as they are not involved. Based on this situation, the PCRF does not know which addresses have been registered by the mobile node. Therefore, the PCRF cannot determine which PCC rules (e.g., IP flows and related policies) need to be sent to the PCEF located at the access gateway for a respective MIP registration.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with coordinating one or multiple Mobile IP registrations of a mobile node with various access gateways with a policy and charging rules function (PCRF). In particular, a home agent (HA), acting as policy and charging enforcement function (PCEF), sends addresses registered as care-of-addresses (CoA) and the home address (HoA) to the PCRF. Thereby, correct associations can be made between a home address of the mobile node and one or more CoA established for correcting sending policy and charging control (PCC) rules from the PCRF to a respective PCEF for the access gateway.

In one aspect, a method is provided for provisioning policy rules for multiple data packet sessions over a wireless communication network to user equipment. A first Internet Protocol (IP) session is established for user equipment (UE) for wireless data packet communications by obtaining an IP address provided by an access policy enforcement function at an access node. A second IP session is instantiated for UE for the wireless data packet communications by binding the IP address of the first session with a home address (HoA) provided by a core policy enforcement function remote to the access node. The establishment of the first and second IP sessions is communicated to a policy rules function. Moreover in an instantiation of the second IP session, the associated CoA is communicated to the policy rule function in order to tie the two sessions. In this way the policy rule function can identify the policy enforcement function where the Quality of Service (QoS) and Policy Charging Control (PCC) rules need to be enforced.

In another aspect, at least one processor is provided for provisioning policy rules for multiple data packet sessions over a wireless communication network to user equipment. A first module establishes an Internet Protocol (IP) first session for user equipment (UE) for wireless data packet communications by obtaining an IP address provided by an access policy enforcement function at an access node. A second module instantiates a second IP session for UE for the wireless data packet communications by binding the IP address of the first session with a home address (HoA) provided by a core policy enforcement function remote to the access node. A third module communicates the establishment of the first and second IP sessions to a policy rule function. A fourth module for communicating the associated IP Address of the first session in response to instantiation of the second IP session to the policy rule function. A fifth module ties the first and second sessions to identify the policy enforcement function where the policy rules need to be enforced.

In an additional aspect, a computer program product is provided for provisioning policy rules for multiple data packet sessions over a wireless communication network to user equipment. A computer-readable storage medium comprises a first set of codes for causing a computer to establish a Internet Protocol (IP) first session for user equipment (UE) for wireless data packet communications by obtaining an IP address provided by an access policy enforcement function at an access node. A second set of codes causes the computer to instantiate a second IP session for UE for the wireless data packet communications by binding the IP address of the first session with a home address (HoA) provided by a core policy enforcement function remote to the access node. A third set of codes causes the computer to communicate the establishment of the first and second IP sessions to a policy rule function. A fourth set of codes for causing the computer to communicate the associated IP Address of the first session in response to instantiation of the second IP session to the policy rule function. A fifth set of codes causes the computer to tie the first and second sessions to identify the policy enforcement function where the policy rules need to be enforced.

In another additional aspect, an apparatus is provided for provisioning policy rules for multiple data packet sessions over a wireless communication network to user equipment. Means are provided for establishing a first Internet Protocol (IP) session for user equipment (UE) for wireless data packet communications by obtaining an IP address provided by an access policy enforcement function at an access node. Means are provided for instantiating a second IP session for UE for the wireless data packet communications by binding the IP address of the first session with a home address (HoA) provided by a core policy enforcement function remote to the access node. Means are provided for communicating the establishment of the first and second IP sessions to a policy rule function. Means are provided for communicating the associated IP Address of the first session in response to instantiation of the second IP session to the policy rule function. Means are provided for tying the first and second sessions to identify the policy enforcement function where the policy rules need to be enforced.

In a further aspect, an apparatus is provided for provisioning policy rules for multiple data packet sessions over a wireless communication network to user equipment. An access policy function at an access node establishes a first Internet Protocol (IP) session for user equipment (UE) for wireless data packet communications by obtaining an IP address. A core policy enforcement function remote to the access node instantiates a second IP session for UE for the wireless data packet communications by binding the IP address of the first session with a home address (HoA). A policy rule function receives a communication comprising the establishment of the first and second IP sessions and HoA associated with the first CoA and for tying the two sessions. The core policy enforcement function communicates the establishment of the first and second IP sessions to a policy rule function. The core policy enforcement function communicates the associated IP Address of the first session in response to instantiation of the second IP session to the policy rule function. The policy rules function ties the first and second sessions to identify the policy enforcement function where the policy rules need to be enforced.

In yet one aspect, a method is provided for requesting multiple data packet sessions at user equipment over a wireless communication network by communicating filtering information comprising routing information between the user equipment and a network, communicating the filtering information by a core policy enforcement function to a policy rules function together with a home address (HoA) and at least one care of address (CoA), and establishing policy rules at an access policy enforcement function by the policy rules function based on the routing information and provided CoA.

In yet another aspect, at least one processor is provided for requesting multiple data packet sessions at user equipment over a wireless communication network. A first module communicates filtering information comprising routing information between the user equipment and a network. A second module communicates the filtering information by a core policy enforcement function to a policy rules function together with a home address (HoA) and at least one care of address (CoA). A third module establishes policy rules at an access policy enforcement function by the policy rules function based on the routing information and provided CoA.

In yet an additional aspect, a computer program product is provided for requesting multiple data packet sessions at user equipment over a wireless communication network. A computer readable storage medium comprises a first set of codes for causing a computer to communicate filtering information comprising routing information between the user equipment and a network. A second set of codes for causes the computer to communicate the filtering information by a core policy enforcement function to a policy rules function together with a home address (HoA) and at least one care of address (CoA). A third set of codes causes the computer to establish policy rules at an access policy enforcement function by the policy rules function based on the routing information and provided CoA.

In yet another additional aspect, an apparatus is provided for requesting multiple data packet sessions at user equipment over a wireless communication network. Means are provided for communicating filtering information comprising routing information between the user equipment and a network. Means are provided for communicating the filtering information by a core policy enforcement function to a policy rules function together with a home address (HoA) and at least one care of address (CoA). Means are provided for establishing policy rules at an access policy enforcement function by the policy rules function based on the routing information and provided CoA.

In yet a further aspect, an apparatus is provided for requesting multiple data packet sessions at user equipment over a wireless communication network. An access node communicates filtering information comprising routing information between user equipment and a network. A core policy enforcement function communicates the filtering information to a policy rules function together with a home address (HoA) and at least one care of address (CoA). The policy rules function establishes policy rules based on the routing information and provided CoA. An access policy enforcement function receives the policy rules.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
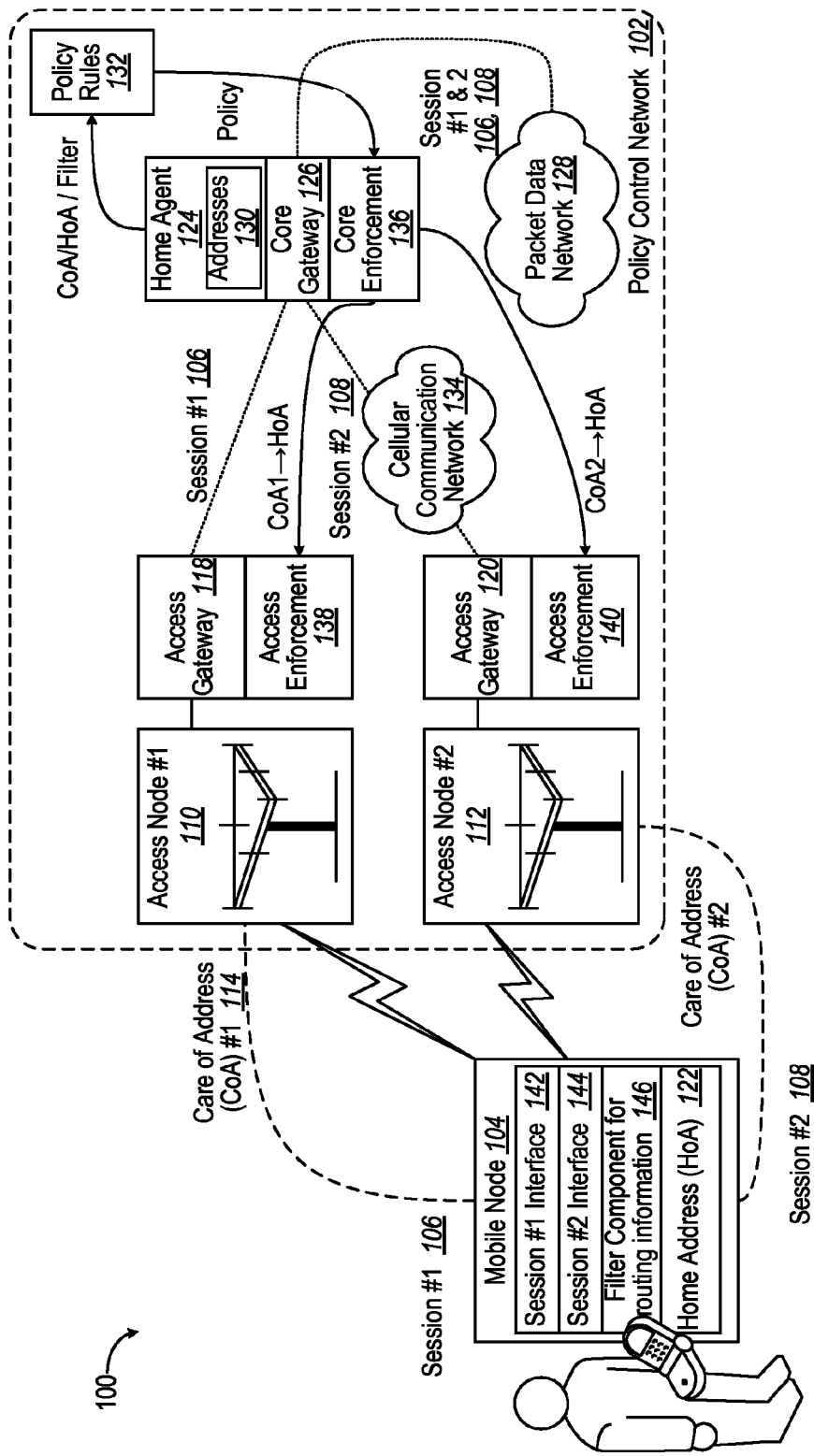
FIG. 1 depicts a block diagram of a communication system employing a policy enforcement function separated between an access gateway and a core gateway for facilitating mobile IP.

In a wireless communication system having multiple access nodes, a home agent (HA) maintains a home address (HoA) for a mobile node so that an Internet Protocol (IP) session can be established. As the mobile node moves within a coverage area of various access nodes, the mobile node can establish a secure relationship with a local access gateway and thereby register a local IP address, referred to as a care-of-address (CoA), with the HA. Thereby, a network-based mobility protocol such as Proxy Mobile IP (PMIP), General Packet Radio Service (GPRS) Tunneling Protocol (GTP), Mobile IP protocol or the like can be established so that multiple sessions (i.e., serial, parallel) can be conducted. In order for policy and charging control (PCC) can be maintained, the HA informs a policy and charging rules function (PCRF), which in turn can then send the appropriate PCC rules (e.g., IP flows and related policies) to a policy and charging enforcement function (PCEF) for a particular access gateway. The HA can further be aware of filters provided by the mobile node as to what application can run on a particular interface. Thereby, the PCC rules disseminated to the PCEF can reflect this filter information.

In another aspect, during the attach to a network and Mobile IP bootstrap phase, two different policy and charging control (PCC) sessions are created for user equipment (UE). In particular, the functionality of PCEF is divided. One session is created between an access policy and charging enforcement function (A-PCEF) and a policy and charging rule function (PCRF), which is bound to a care-of-address (CoA) provided by the A-PCEF during session establishment. Another session is created between a core PCEF (C-PCEF) and the PCRF, which is bound to a Home Address (HoA) provided by the C-PCEF during session establishment. After establishment of the PCC sessions, the PCRF sends PCC rules to the A-PCEF and C-PCEF. Rules sent to A-PCEF have also the CoA information in a flow description whereas rules sent to C-PCEF have HoA in a flow description. The PCRF ties the two PCC sessions as belonging to the same UE. In one illustrative implementation, a Subscription-ID attribute-value pair (AVP) can be used that carries the identity of the UE. In another implementation the CoA can be used to tie the two PCC sessions; in order to enable that the C-PCEF sends both the HoA and CoA during the session establishment or session update.

It should be appreciated with the benefit of the present disclosure that aspects described herein for the Access-PCEF can be incorporated into a 3GPP Bearer Binding and Event Reporting Function (BBERF). Similarly, aspects described herein for the Core-PREF can be incorporated into a 3GPP PCEF.

However, situations arise in which the UE can have multiple addresses configured in a specific link with one or more addresses registered as CoA's. The PCRF should know which address provided by the A-PCEF is registered as CoA in order to send the correct PCC rules and flow descriptors when needed. For instance, such a PCC rule and flow descriptors can be needed when an Application Function modifies a receive (Rx) session and tells the PCRF to modify the Quality of Service (QoS) accordingly. The PCRF sends new PCC rules to the C-PCEF bound to that Rx session but also to the CoA bound to that Mobile IP (MIP) registration.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Referring initially to FIG. 1, a wireless communication system 100 comprises policy control network 102 that supports the mobility for a mobile node 104, also referred to as user equipment (UE) or access terminal, to establish subsequent or simultaneous data packet sessions #1, #2 106, 108, such as but not limited to Mobile Internet Protocol (IP), with a plurality of access nodes #1, #2 (e.g., base station), 110, 112. The mobile node 104 establishes each session 106, 108 by obtaining a respective care-of-address (CoA) 114, 116 from a respective access gateway 118, 120. The mobile node 104 has a home address (HoA) 122 that facilitates accessing associated services while moving between access gateways To that end, a home agent (HA) 124 at a core gateway 126 maintains information about the HoA 122 that can be necessary for example to access certain services available from a packet data network (PDN) 128. First and second access gateways 118, 120 for each access node 110, 112 respectively can communicate with the core gateway 126 in order to establish each session 106, 108; the home agent (HA) 124 maintains an association 130 of the HoA 122 with these CoA's 114, 116.

A policy rules function 132, which can be part of a cellular communication network 134, has a need to distribute rules for purposes such as Quality of Service (QoS), charging, etc., for these sessions 106, 108. By having the home agent (HA) 124 and core policy enforcement function (C-PCEF) 136 communicate these associated HoA 122 and CoA's 114, 116 to the policy rules function 130, policy rules can be appropriately disseminated to a respective access policy enforcement function 138, 140 at the access gateways 118, 120.

Alternatively or in addition, in one aspect the mobile node 104 can represent a stationary or mobile device taking advantage of differing capabilities of the two access nodes #1, #2 110, 112, such as what flows are routed through which node, depicted as a session #1 interface 142 and a session #2 interface 144. A filter component captures routing information for different IP flows through different accesses 146. For instance, one node 110 can be capable of high-bandwidth subscriber services (e.g., streaming multimedia content) whereas the other node 112 is capable of a non-subscriber, low bandwidth IP messaging service. The home agent (HA) 124 advantageously can obtain information regarding this different routing of flows and communicates it to the policy rules function 132 so that policy rules are appropriate for the respective sessions 106, 108.

Figure 2:
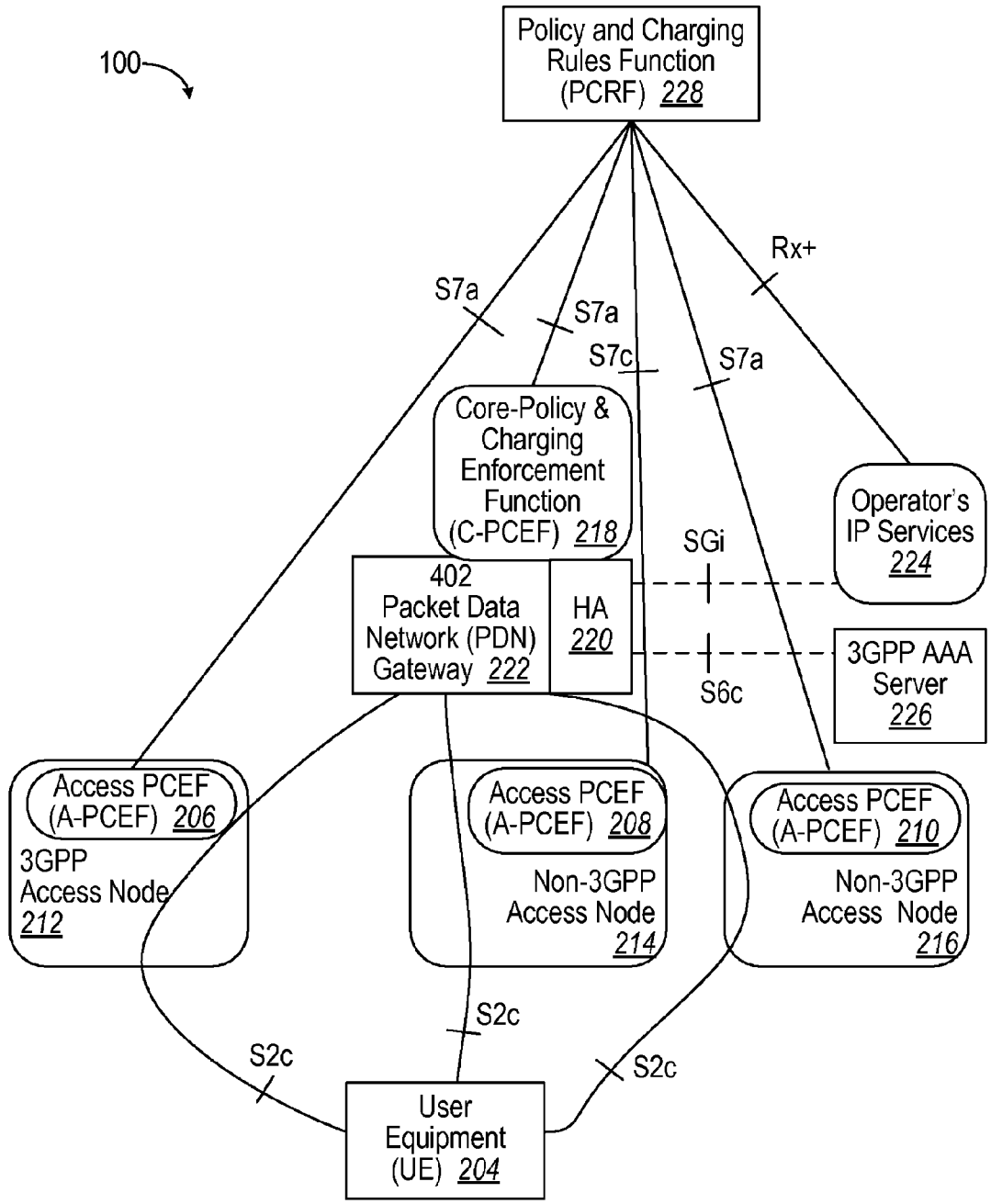
FIG. 2 depicts a block diagram of a policy and charging control (PCC) architecture for client-based mobility.
Figure 3:
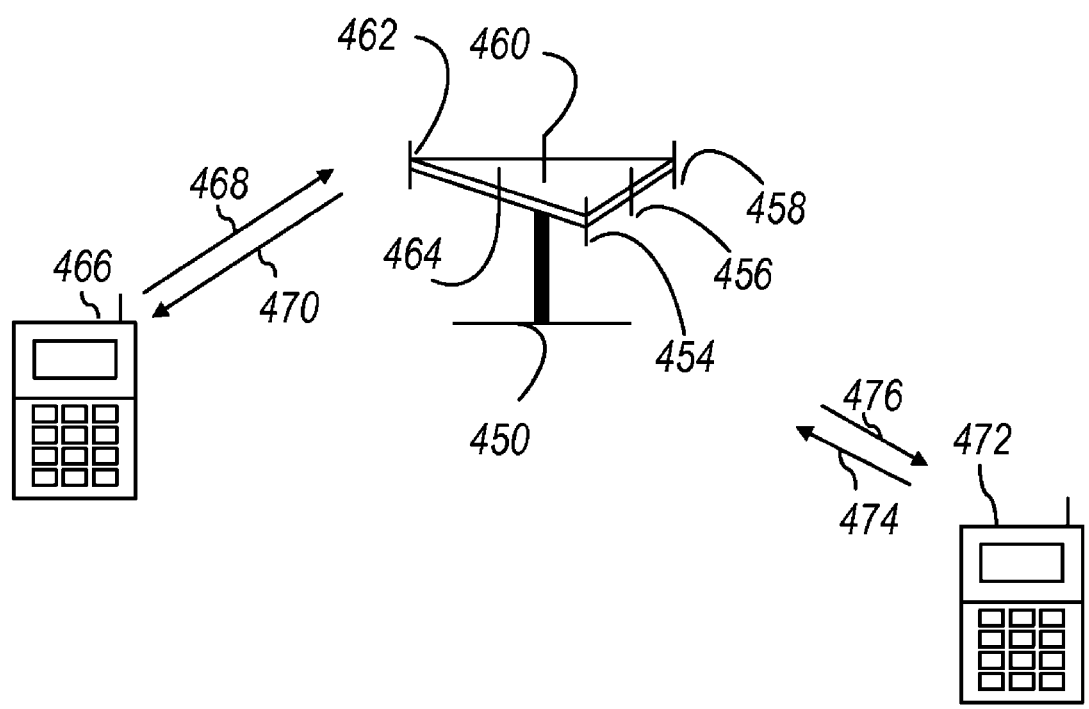
FIG. 3 depicts a diagram of a multiple access wireless communication system according to one aspect for client-based mobility.

In FIG. 2, a policy charging control (PCC) architecture 200 of a wireless communication system 202 is enhanced for mobile communications between with user equipment (UE) 204 that entail a plurality of IP addresses (e.g., CoA's, HoA). In particular, two different policy and charging enforcement functions (PCEFs) are provided, specifically Access PCEFs 206, 208, 210, which are located respectively at a 3GPP access gateway (GW) 212 and two Non-3GPP access nodes 214, 216, and a core PCEF 218 located at a home agent (HA) 220 at a 402 packet data network (PDN) gateway ("core" GW) 222. The PDN GW 222 and HA 220 are interfaced to operator's IP services 224 and 3GPP (AAA) server 226 via SGi interface and S6c interface, respectively. The UE 204 forms an S2c interface respectively via each access node 212, 214, 216 with the 402 PDN GW 222. A policy and charging rules function (PCRF) 228 communicates via respective S7a interfaces with A-PDEFs 212, 214, 216 and via an S7c interface with the C-PDEF 218. The interfaces S7a and S7c can reflect differences advantageous for splitting the functionality of PCEF into core and access PCEFs.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 4:
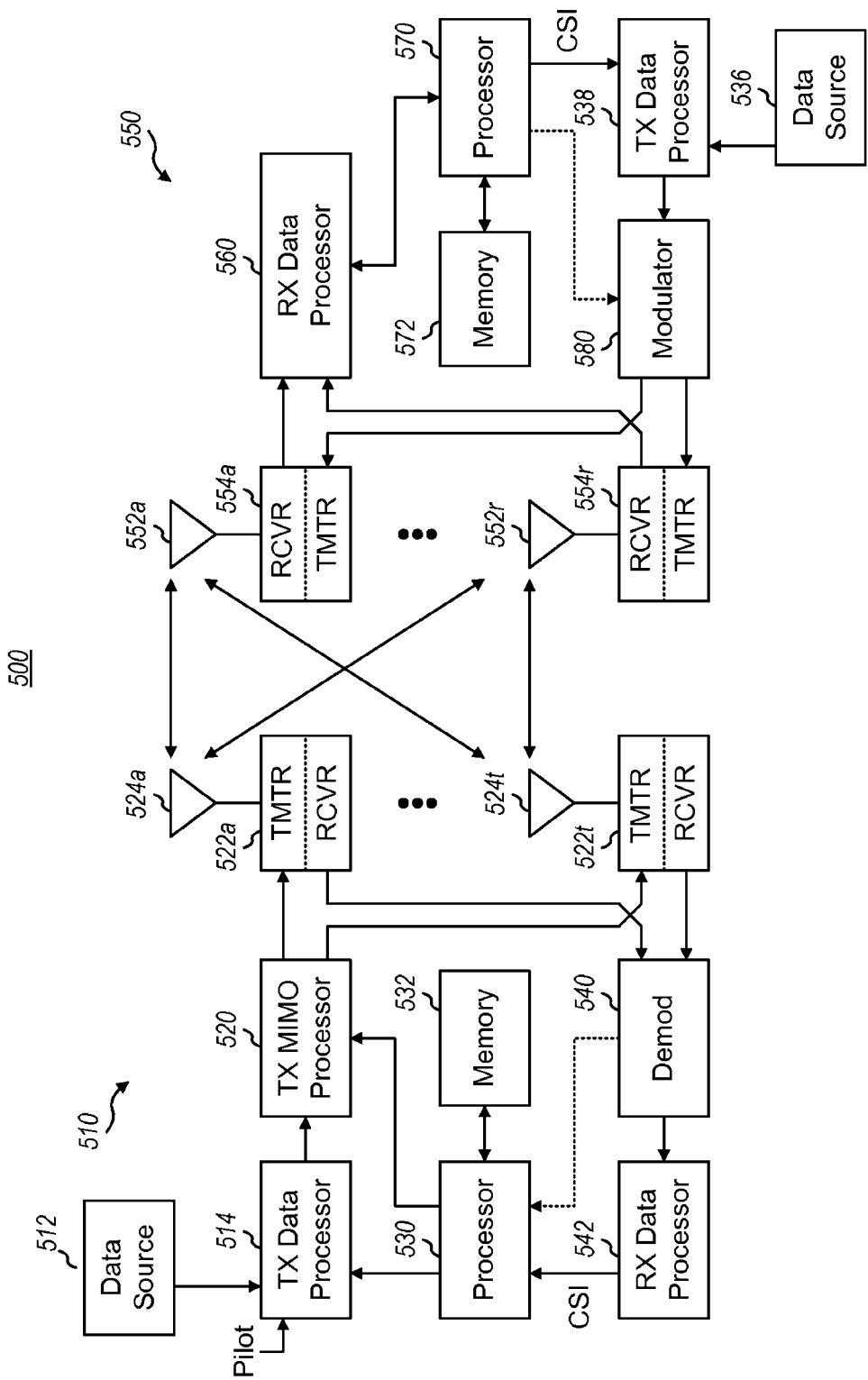
FIG. 4 depicts a schematic block diagram of a communication system for supporting client-based mobility.

Referring to FIG. 4, a multiple access wireless communication system according to one aspect is illustrated. An access point 450 (AP) includes multiple antenna groups, one including 454 and 456, another including 458 and 460, and an additional including 462 and 464. In FIG. 4, only two antennas are shown for each antenna group, however, more or fewer antennas may be utilized for each antenna group. Access terminal (AT) 466 is in communication with antennas 462 and 464, where antennas 462 and 464 transmit information to access terminal 466 over forward link 470 and receive information from access terminal 466 over reverse link 468. Access terminal 472 is in communication with antennas 456 and 458, where antennas 456 and 458 transmit information to access terminal 472 over forward link 476 and receive information from access terminal 472 over reverse link 474. In a FDD system, communication links 468, 470, 474 and 476 may use different frequency for communication. For example, forward link 470 may use a different frequency then that used by reverse link 468. Each group of antennas and/or the area in which they are designed to communicate is often referred to as a sector of the access point 450. In the aspect, antenna groups each are designed to communicate to access terminals 466, 472 in a sector of the areas covered by access point 450.

In communication over forward links 470 and 476, the transmitting antennas of access point 450 utilize beamforming in order to improve the signal-to-noise ratio of forward links for the different access terminals 466 and 474. Also, an access point using beamforming to transmit to access terminals scattered randomly through its coverage causes less interference to access terminals in neighboring cells than an access point transmitting through a single antenna to all its access terminals.

An access point 450 may be a fixed station used for communicating with the terminals and may also be referred to as an access point, a Node B, or some other terminology. An access terminal 466, 472 may also be called user equipment (UE), a wireless communication device, terminal, access terminal or some other terminology.

Figure 5:
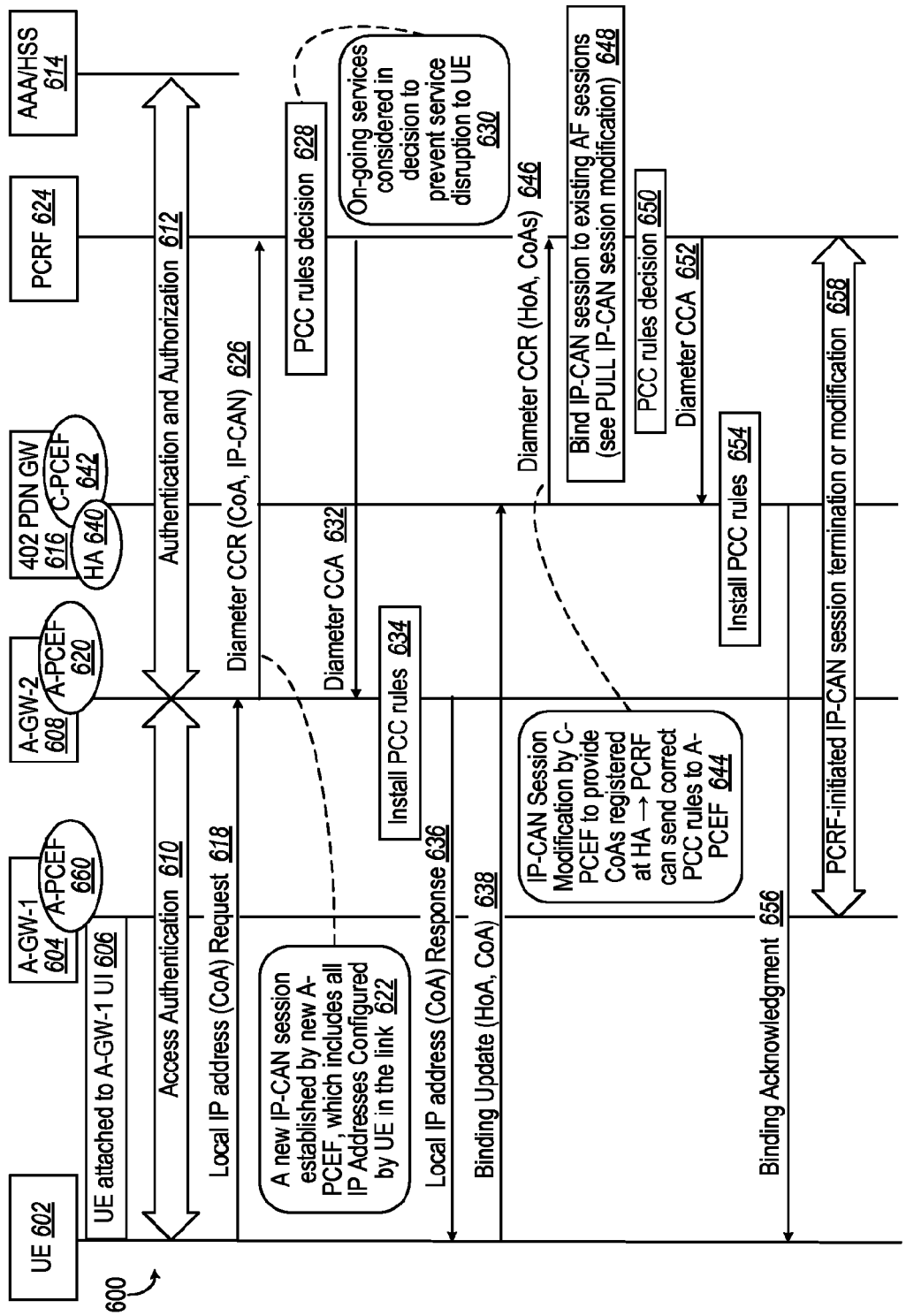
FIG. 5 depicts a timing diagram of a methodology for PCC architecture and client-based mobility.

FIG. 5 is a block diagram of an aspect of a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514.

In an aspect, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain implementations, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and downconverts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550.

Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

Figure 6:
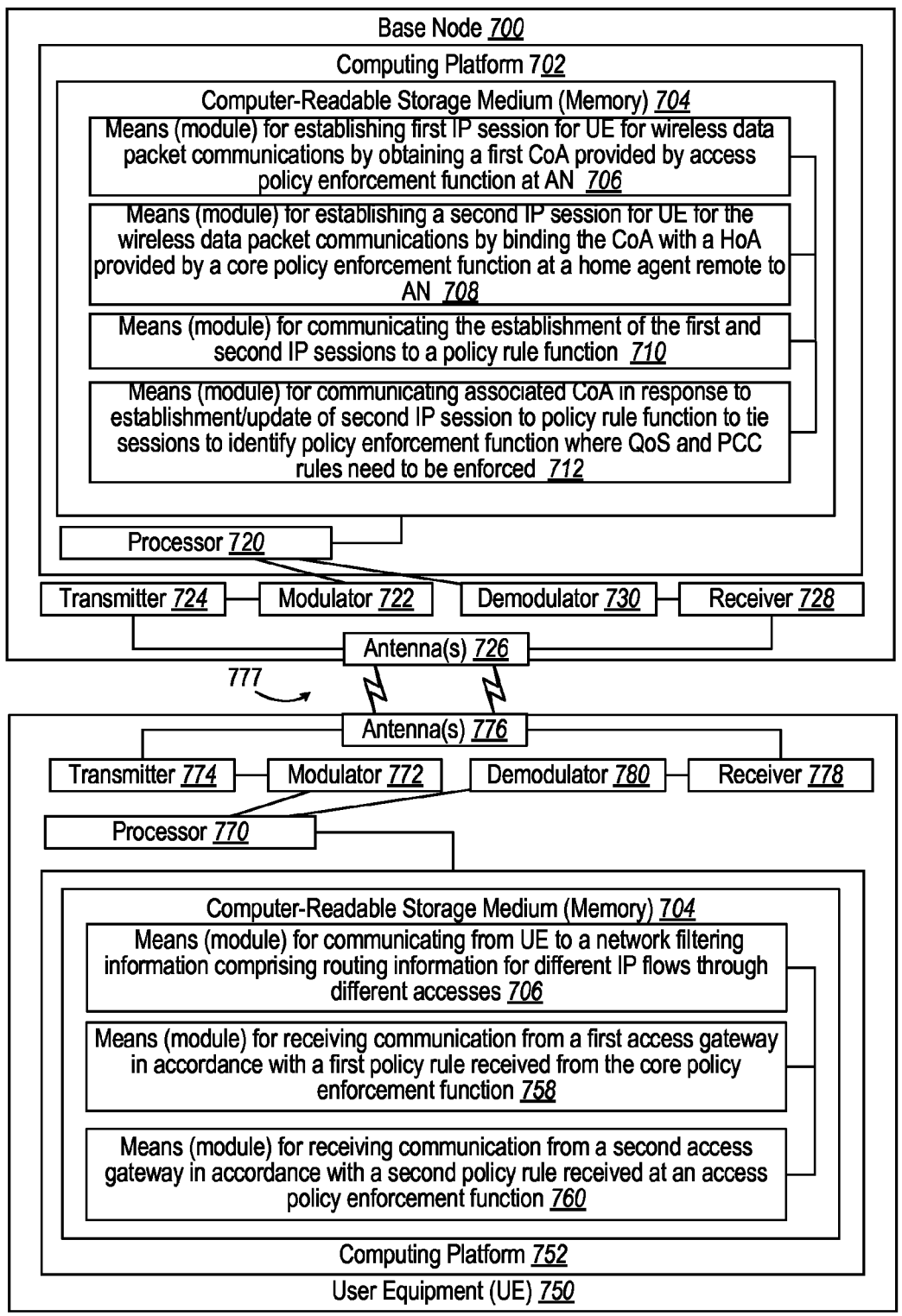
FIG. 6 illustrates a block diagram of user equipment and base node having modules for PCC architecture with client-based mobility.

In FIG. 6, a methodology 600 is depicted for an S2c handover and flow descriptor to provide for PCC rule provisioning for multiple mobile IP sessions. A UE 602 is attached to an access gateway #1 (A-GW-1) 604 (block 606). The UE 602 performs access authentication to an access gateway #2 (A-GW-2) 608 as depicted at 610, which in turn completes forming a secure attachment by performing authentication and authorization (block 612) with Authentication, Authorization, and Accounting (AAA)/Home Subscriber Server (HSS) 614 via a 402 packet data network (PDN) gateway 616, also referred to as "core PDN GW". The UE 602 is then able to request a local IP address (CoA) from the A-GW-2 608, depicted at 618. A new IP-CAN (Internet Protocol Connectivity Access Network) session is established (instantiated) by a new access-PCEF 620 at the A-GW-2 608 by including all IP addresses configured by the UE 602 in the link (block 622).

In an illustrative aspect, this is provided by the A-PCEF 620 sending an Internet Engineering Task Force (IETF) Diameter (RFC 3588) Credit Control Request (CCR) message to a PCRF 624, linking a CoA with the IP-CAN session, depicted at 626. The PCRF 624 responds by making a rules decision (block 628). As depicted in block 630, the PCRF 624 can advantageously consider as an input what services are on-going in deciding on PCC rules so that service disruption is not experienced by the UE 602. The PCRF 624 provisions the A-GW-2 608 by sending a Diameter credit control answer (CCA) as depicted at 632. The A-PCEF 620 at the A-GW-2 608 installs the PCC rules (block 634). The A-GW-2 608 transmits a local IP address (CoA) response to the UE 602 as depicted at 636. The UE 602 provides a binding update (BU) to the 420 PDN GW 616 that includes the Home Address (HoA) for the UE 602 as well as the new CoA as depicted at 638.

A Home Agent (HA) 640 at the 402 PDN GW 616 keeps track of these associations between HoA and CoA. A core PCEF (C-PCEF) 642 also at the PDN GW 616 performs an IP-CAN session modification in order to provide the PCRF 624 with the CoAs registered at the HA 640 so that the correct PCC rules can be sent to the A-PCEF 620 (block 644). To that end, the 402 PDN GW 616 sends a Diameter CCR that includes HoA and CoAs to the PCRF 624 as depicted at 646. The PCRF 624 binds the IP-CAN session to existing Application Functions (AF) sessions, such as by PULL IP-CAN session modification (block 648). The PCRF 624 makes a PCC rules decision (block 650) and responds with a Diameter CCA, depicted at 652. The 402 PDN GW (Core GW) 616 installs the PCC rules (block 654) and sends a binding acknowledgement to the UE 602, as depicted at 656. PCRF-initiated IP-CAN session termination or modification is made as appropriate as depicted at 658 between the PCRF 624 and an A-PCEF 660 at the A-GW-1 604.

In FIG. 7, evolved base node (eNB) 700 has a computing platform 702 that provides means such as sets of codes for causing a computer to conduct multiple wireless IP sessions for client-based mobility within a PCC architecture. In particular, the computing platform 702 supports such sessions having multiple care of addresses (CoA) that need to be associated with a home address (HoA) of the UE 700 for Policy and Charging Control (PCC) purposes. In particular, the computing platform 702 includes a computer readable storage medium (e.g., memory) 704 that stores a plurality of modules 706-712 executed by a processor(s) 720. A modulator 722 controlled by the processor 720 prepares a downlink signal for modulation by a transmitter 724, radiated by antenna(s) 726. A receiver 728 receives uplink signals from the antenna(s) 726 that are demodulated by a demodulator 728 and provided to the processor 720 for decoding. In particular, a means (e.g., module, set of codes) 706 is provided for establishing a first Internet Protocol (IP) session for user equipment (UE) for wireless data packet communications by obtaining an IP address provided by an access policy enforcement function at an access node. A means (e.g., module, set of codes) 708 is provided for instantiating a second IP session for UE for the wireless data packet communications by binding the IP address of the first session with a home address (HoA) provided by a core policy enforcement function remote to the access node. A means (e.g., module, set of codes) 710 is provided for communicating the establishment of the first and second IP sessions to a policy rule function. A means (e.g., module, set of codes) 712 is provided for communicating the associated IP Address of the first session in response to instantiation of the second IP session to the policy rule function. The first and second sessions are tied to identify the policy enforcement function where the policy rules need to be enforced. In one aspect, the two sessions are tied to identify the policy enforcement function where the Quality of Service (QoS) and Policy Charging Control (PCC) rules need to be enforced.

With continued reference to FIG. 7, user equipment (UE) 750 has a computing platform 752 that provides means such as sets of codes for causing a computer to request multiple wireless IP sessions for client-based mobility within a PCC architecture. In particular, the computing platform 752 supports such sessions having multiple care of addresses (CoA) that need to be associated with a home address (HoA) of the UE 750 for Policy and Charging Control (PCC) purposes. In particular, the computing platform 752 includes a computer readable storage medium (e.g., memory) 754 that stores a plurality of modules 756-760 executed by a processor(s) 770. A modulator 772 controlled by the processor 770 prepares an uplink signal for modulation by a transmitter 774, radiated by antenna(s) 776 as depicted at 777 to the eNB 700. A receiver 778 receives downlink signals from the eNB 700 from the antenna(s) 776 that are demodulated by a demodulator 778 and provided to the processor 770 for decoding. In particular, a means (e.g., module, set of codes) 756 is for communicating from user equipment to a network filtering information comprising routing information for different Internet Protocol (IP) flows through different accesses. Means (e.g., module, set of codes) 758 are provided for receiving communication from a first access gateway in accordance with a first policy rule received from the core policy enforcement function. Means (e.g., module, set of codes) 760 are provided for receiving communication from a second access gateway in accordance with a second policy rule received at an access policy enforcement function, wherein the network communicates the filtering information by a core policy enforcement function to a policy rules function together with a home address (HoA) and at least one care of address (CoA), and establishes resources by the policy rules function based on the routing information and provided CoA.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for provisioning policy rules for multiple data packet sessions over a wireless communication network to user equipment, comprising:

establishing a first Internet Protocol (IP) session for user equipment (UE) for wireless data packet communications by obtaining an IP address provided by an access policy enforcement function at an access node, wherein the first IP session is established between the UE and the access node;

instantiating a second IP session for the UE for the wireless data packet communications by binding the IP address of the first session with a home address (HoA) provided by a core policy enforcement function, wherein the core policy enforcement function is provided remote to the access node, and wherein the second IP session is established between the UE and a packet data network gateway;

communicating the establishment of the first and second IP sessions to a policy rule function provided in a core network gateway;
communicating an associated IP address of the first session in response to instantiation of the second IP session to the policy rule function; and
tying the first and the second IP sessions in a binding update to the packet data network gateway to identify the policy enforcement function where the policy rules need to be enforced.

2. The method of claim 1, further comprising:
determining at the policy rule function that a prior session with a first access gateway existed for the UE; and
modifying the prior session through a policy rule function-initiated communication to a second access policy enforcement function at the second access gateway.

3. The method of claim 2, further comprising modifying the prior session by terminating.

4. The method of claim 1, further comprising:
communicating from user equipment to the policy rules function filtering information; and
determining policy rules that reflect the filtering information.

5. A method for provisioning policy rules for multiple data packet sessions over a wireless communication network to user equipment, comprising:
establishing a first Internet Protocol (IP) session for user equipment (UE) for wireless data packet communications by obtaining an IP address provided by an access policy enforcement function at an access node;
instantiating a second IP session for the UE for the wireless data packet communications by binding the IP address of the first session with a home address (HoA) provided by a core policy enforcement function remote to the access node;
communicating the establishment of the first and second IP sessions to a policy rule function;
communicating an associated IP address of the first session in response to instantiation of the second IP session to the policy rule function;
tying the first and the second IP sessions in a binding update to the packet data network gateway to identify the policy enforcement function where the policy rules need to be enforced;
receiving a binding update (BU) from the UE at a Home Agent; and
communicating the establishment of a first IP session and the instantiation of a second IP session and HoA associated with the IP address of the first IP session to the policy rule function by sending a credit control request (CCR) with registered IP addresses.

6. A non-transitory computer-readable medium containing computer-executable instructions for provisioning policy rules for multiple data packet sessions over a wireless communication network to user equipment, comprising:
a first set of codes for causing a computer to establish a first Internet Protocol (IP) session for user equipment (UE) for wireless data packet communications by obtaining an IP address provided by an access policy enforcement function at an access node, wherein the first IP session is established between the UE and the access node;
a second set of codes for causing the computer to establish a second IP session for the UE for the wireless data packet communications by binding the IP address of the first session with a home address (HoA) provided by a core policy enforcement function, wherein the core policy enforcement function is provided remote to the access node, wherein the second IP session is established between the UE and a packet data network gateway;
a third set of codes for causing the computer to communicate the establishment of the first and second IP sessions to a policy rule function provided in a core network gateway;
a fourth set of codes for causing the computer to communicate the associated IP Address of the first session in response to establishment or update of the second IP session to the policy rule function; and
a fifth set of codes for causing the computer to tie the first and second IP sessions in a binding update to the packet data network gateway to identify the policy enforcement function where the policy rules need to be enforced.

7. The non-transitory computer-readable medium of claim 6, further comprising:
a set of codes for causing the computer to determine at the policy rule function that a prior session with a second access gateway existed for the UE; and
a set of codes for causing the computer to modify the prior session through a policy rule function-initiated communication to a second access policy enforcement function at the second access gateway.

8. The non-transitory computer-readable medium of claim 7, further comprising a set of codes for causing the computer to modify the prior session by terminating.

9. The non-transitory computer-readable medium of claim 6, further comprising:
a set of codes for causing the computer to communicate from user equipment to the policy rules function filtering information; and
a set of codes for causing the computer to determine policy rules that reflect the filtering information.

10. A non-transitory computer-readable medium containing computer-executable instructions for provisioning policy rules for multiple data packet sessions over a wireless communication network to user equipment, comprising:
a first set of codes for causing a computer to establish a first Internet Protocol (IP) session for user equipment (UE) for wireless data packet communications by obtaining an IP address provided by an access policy enforcement function at an access node;
a second set of codes for causing the computer to establish a second IP session for the UE for the wireless data packet communications by binding the IP address of the first session with a home address (HoA) provided by a core policy enforcement function remote to the access node;
a third set of codes for causing the computer to communicate the establishment of the first and second IP sessions to a policy rule function;
a fourth set of codes for causing the computer to communicate the associated IP Address of the first session in response to establishment or update of the second IP session to the policy rule function;
a fifth set of codes for causing the computer to tie the first and second IP sessions in a binding update to the packet data network gateway to identify the policy enforcement function where the policy rules need to be enforced;
a set of codes for causing the computer to receive a binding update (BU) from the UE at a Home Agent; and
a set of codes for causing the computer to communicate the establishment of a first IP session and the instantiation of a second IP session and HoA associated with the IP address of the first IP session to the policy rule function by sending a credit control request (CCR) with registered IP addresses.

11. An apparatus for provisioning policy rules for multiple data packet sessions over a wireless communication network to user equipment, comprising:
   means for establishing a first Internet Protocol (IP) session for user equipment (UE) for wireless data packet communications by obtaining an IP address provided by an access policy enforcement function at an access node, wherein the first IP session is established between the UE and the access node;
   means for establishing a second IP session for the UE for the wireless data packet communications by binding the IP address of the first session with a home address (HoA) provided by a core policy enforcement function, wherein the core policy enforcement function is remote to the access node, and wherein the second IP session is established between the UE and a packet data network gateway;
   means for communicating the establishment of the first and second IP sessions to a policy rule function provided in a core network gateway;
   means for communicating the associated IP Address of the first session in response to establishment or update of the second IP session to the policy rule function; and
   means for tying the first and second IP sessions in a binding update to the packet data network gateway to identify the policy enforcement function where the policy rules need to be enforced.

12. The apparatus of claim 11, further comprising:
   means for determining at the policy rule function that a prior session with a first access gateway existed for the UE; and
   means for modifying the prior session through a policy rule function-initiated communication to a second access policy enforcement function at the second access gateway.

13. The apparatus of claim 12, further comprising modifying the prior session by terminating.

14. The apparatus of claim 11, further comprising:
   means for communicating from user equipment to the policy rules function filtering information; and
   means for determining policy rules that reflect the filtering information.

15. An apparatus for provisioning policy rules for multiple data packet sessions over a wireless communication network to user equipment, comprising:
   means for establishing a first Internet Protocol (IP) session for user equipment (UE) for wireless data packet communications by obtaining an IP address provided by an access policy enforcement function at an access node;
   means for establishing a second IP session for the UE for the wireless data packet communications by binding the IP address of the first session with a home address (HoA) provided by a core policy enforcement function remote to the access node;
   means for communicating the establishment of the first and second IP sessions to a policy rule function;
   means for communicating the associated IP Address of the first session in response to establishment or update of the second IP session to the policy rule function;
   means for tying the first and second IP sessions in a binding update to the packet data network gateway to identify the policy enforcement function where the policy rules need to be enforced;
   means for receiving a binding update (BU) from the UE at a Home Agent; and
   means for communicating the establishment of a first IP session and the instantiation of a second IP session and HoA associated with the IP address of the first IP session to the policy rule function by sending a credit control request (CCR) with registered IP addresses.

16. An apparatus for provisioning policy rules for multiple data packet sessions over a wireless communication network to user equipment, comprising:
   an access policy function provided at an access node for establishing a first Internet Protocol (IP) session for user equipment (UE) for wireless data packet communications by obtaining an IP address, wherein the first IP session is established between the UE and the access node;
   a core policy enforcement function remote to the access node for establishing a second IP session for the UE for the wireless data packet communications by binding the IP address of the first session with a home address (HoA), wherein the second IP session is established between the UE and a packet data network gateway;
   a policy rule function provided in a core network gateway for receiving a communication comprising the establishment of the first and second IP sessions and HoA associated with a first CoA and for tying the two sessions;
   the core policy enforcement function for communicating the establishment of the first and second IP sessions to a policy rule function;
   the core policy enforcement function for communicating the associated IP Address of the first session in response to establishment or update of the second IP session to the policy rule function; and
   tying the first and second IP sessions in a binding update to the packet data network gateway to identify the policy enforcement function where the policy rules need to be enforced.

17. The apparatus of claim 16, wherein the policy rule function is further for determining at the policy rule function that a prior session with a first access gateway existed for the UE, and further for modifying the prior session through a policy rule function-initiated communication to a second access policy enforcement function at the second access gateway.

18. The apparatus of claim 17, wherein the policy rule function is further for modifying the prior session by terminating.

19. The apparatus of claim 16, wherein the home agent is further for communicating filtering information from user equipment to the policy rules function, and wherein the policy rule function is further for determining policy rules that reflect the filtering information.

20. An apparatus for provisioning policy rules for multiple data packet sessions over a wireless communication network to user equipment, comprising:
   an access policy function at an access node for establishing a first Internet Protocol (IP) session for user equipment (UE) for wireless data packet communications by obtaining an IP address;
   a core policy enforcement function remote to the access node for establishing a second IP session for the UE for the wireless data packet communications by binding the IP address of the first session with a home address (HoA);

a policy rule function for receiving a communication comprising the establishment of the first and second IP sessions and HoA associated with a first CoA and for tying the two sessions;

the core policy enforcement function for communicating the establishment of the first and second IP sessions to a policy rule function;

the core policy enforcement function for communicating the associated IP Address of the first session in response to establishment or update of the second IP session to the policy rule function;

tying the first and second IP sessions in a binding update to the packet data network gateway to identify the policy enforcement function where the policy rules need to be enforced;

a core gateway for receiving a binding update (BU) from the UE at a Home Agent, and for the core gateway for communicating the establishment of a first IP session and instantiation of a second IP session and HoA associated with the IP address of the first IP session to the policy rule function by sending a credit control request (CCR) with registered IP addresses.

21. A method for requesting multiple data packet sessions at user equipment over a wireless communication network, comprising:

communicating filtering information comprising routing information based on capabilities of a plurality of access nodes between the user equipment and a network;

communicating the filtering information by a core policy enforcement function to a policy rules function together with a home address (HoA) and at least one care of address (CoA); and establishing policy rules at an access policy enforcement function by the policy rules function based on the routing information and provided CoA, wherein the filtering information is used to select interfaces for routing flows between the user equipment and the network.

22. At least one processor for requesting multiple data packet sessions at user equipment over a wireless communication network, comprising:

a first processor for communicating filtering information comprising routing information based on capabilities of a plurality of access nodes between the user equipment and a network;

a second processor for communicating the filtering information by a core policy enforcement function to a policy rules function together with a home address (HoA) and at least one care of address (CoA); and a third processor for establishing policy rules at an access policy enforcement function by the policy rules function based on the routing information and provided CoA, wherein the filtering information is used to select interfaces for routing flows between the user equipment and the network.

23. A non-transitory computer-readable medium containing computer-executable instructions for requesting multiple data packet sessions at user equipment over a wireless communication network, comprising:

a first set of codes for causing the computer to communicate filtering information comprising routing information based on capabilities of a plurality of access nodes between the user equipment and a network;

a second set of codes for causing the computer to communicate the filtering information by a core policy enforcement function to a policy rules function together with a home address (HoA) and at least one care of address (CoA); and a third set of codes for causing the computer to establish policy rules at an access policy enforcement function by the policy rules function based on the routing information and provided CoA, wherein the filtering information is used to select interfaces for routing flows between the user equipment and the network.

24. An apparatus for requesting multiple data packet sessions at user equipment over a wireless communication network, comprising:

means for communicating filtering information comprising routing information based on capabilities of a plurality of access nodes between the user equipment and a network;

means for communicating the filtering information by a core policy enforcement function to a policy rules function together with a home address (HoA) and at least one care of address (CoA); and means for establishing policy rules at an access policy enforcement function by the policy rules function based on the routing information and provided CoA, wherein the filtering information is used to select interfaces for routing flows between the user equipment and the network.

25. A system for requesting multiple data packet sessions at user equipment over a wireless communication network, comprising:

a network;

access nodes for communicating filtering information comprising routing information based on capabilities of a plurality of access nodes between user equipment and the network;

a policy rules function;

a core policy enforcement function for communicating the filtering information to the policy rules function together with a home address (HoA) and at least one care of address (CoA);

the policy rules function for establishing policy rules based on the routing information and provided CoA, wherein the filtering information is used to select interfaces for routing flows between the user equipment and the network; and an access policy enforcement function for receiving the policy rules.

* * * * *